(12) United States Patent
Asai et al.

(10) Patent No.: US 10,977,940 B2
(45) Date of Patent: Apr. 13, 2021

(54) VEHICLE INFORMATION PROVISION DEVICE AND VEHICLE INFORMATION PROVISION SYSTEM

(71) Applicant: DENSO CORPORATION, Kariya (JP)

(72) Inventors: Toshitaka Asai, Kariya (JP); Toshiharu Shiratsuchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/794,117

(22) Filed: Feb. 18, 2020

(65) Prior Publication Data

US 2020/0184813 A1 Jun. 11, 2020

Related U.S. Application Data

(63) Continuation of application No. PCT/JP2018/027594, filed on Jul. 24, 2018.

(30) Foreign Application Priority Data

Aug. 23, 2017 (JP) .............................. JP2017-160360
Jun. 6, 2018 (JP) .............................. JP2018-108927

(51) Int. Cl.
*G08G 1/0967* (2006.01)
*B60W 50/14* (2020.01)
*G08G 1/0968* (2006.01)

(52) U.S. Cl.
CPC ....... *G08G 1/096775* (2013.01); *B60W 50/14* (2013.01); *G08G 1/096811* (2013.01); *B60W 2050/143* (2013.01)

(58) Field of Classification Search
CPC ....... G08G 1/096775; G08G 1/096811; B60W 50/14; B60W 2050/143
See application file for complete search history.

(56) References Cited

U.S. PATENT DOCUMENTS 10,210,756 B2 * 2/2019 Arunachalam ...... G08G 1/0965
2019/0137990 A1 * 5/2019 Golgiri ................ G05D 1/005

FOREIGN PATENT DOCUMENTS

JP 4396856 B2 1/2010

* cited by examiner

*Primary Examiner* — Andrew L Sniezek
(74) *Attorney, Agent, or Firm* — Harness, Dickey & Pierce, P.L.C.

(57) ABSTRACT

A vehicle information provision device may be mounted on a vehicle and provide information. The vehicle information provision device may output at least one sound information item out of a plurality of sound information items. The vehicle information provision device may determine whether the plurality of sound information items related to the vehicle are necessary to be provided.

12 Claims, 14 Drawing Sheets

VEHICLE INFORMATION PROVISION DEVICE AND VEHICLE INFORMATION PROVISION SYSTEM

CROSS REFERENCE TO RELATED APPLICATIONS

The present application is a continuation application of International Patent Application No. PCT/JP2018/027594 filed on Jul. 24, 2018, which designated the U.S. and claims the benefit of priority from Japanese Patent Application No. 2017-160360 filed on Aug. 23, 2017 and Japanese Patent Application No. 2018-108927 filed on Jun. 6, 2018. The entire disclosures of all of the above applications are incorporated herein by reference.

TECHNICAL FIELD

The present disclosure relates to a vehicle information provision device and a vehicle information provision system.

BACKGROUND

A vehicle information provision device which simultaneously provides a plurality of sound information items is known.

SUMMARY

The present disclosure provides a vehicle information provision device and a vehicle information provision system capable of favorably providing a plurality of sound information items.

The vehicle information provision device may be mounted on a vehicle and provide information. The vehicle information provision device may output at least one sound information item out of a plurality of sound information items. The vehicle information provision device may determine whether the plurality of sound information items related to the vehicle are necessary to be provided.

The vehicle information provision system may be mounted on a vehicle and provide information. The vehicle information provision system may output at least one sound information item out of a plurality of sound information items. The vehicle information provision system may determine whether the plurality of sound information items related to the vehicle are necessary to be provided.

BRIEF DESCRIPTION OF DRAWINGS

The above and other objects, features, and advantages of the present disclosure will become more apparent from the following detailed description made with reference to the accompanying drawings. In the drawings.

DETAILED DESCRIPTION

Figure 1:
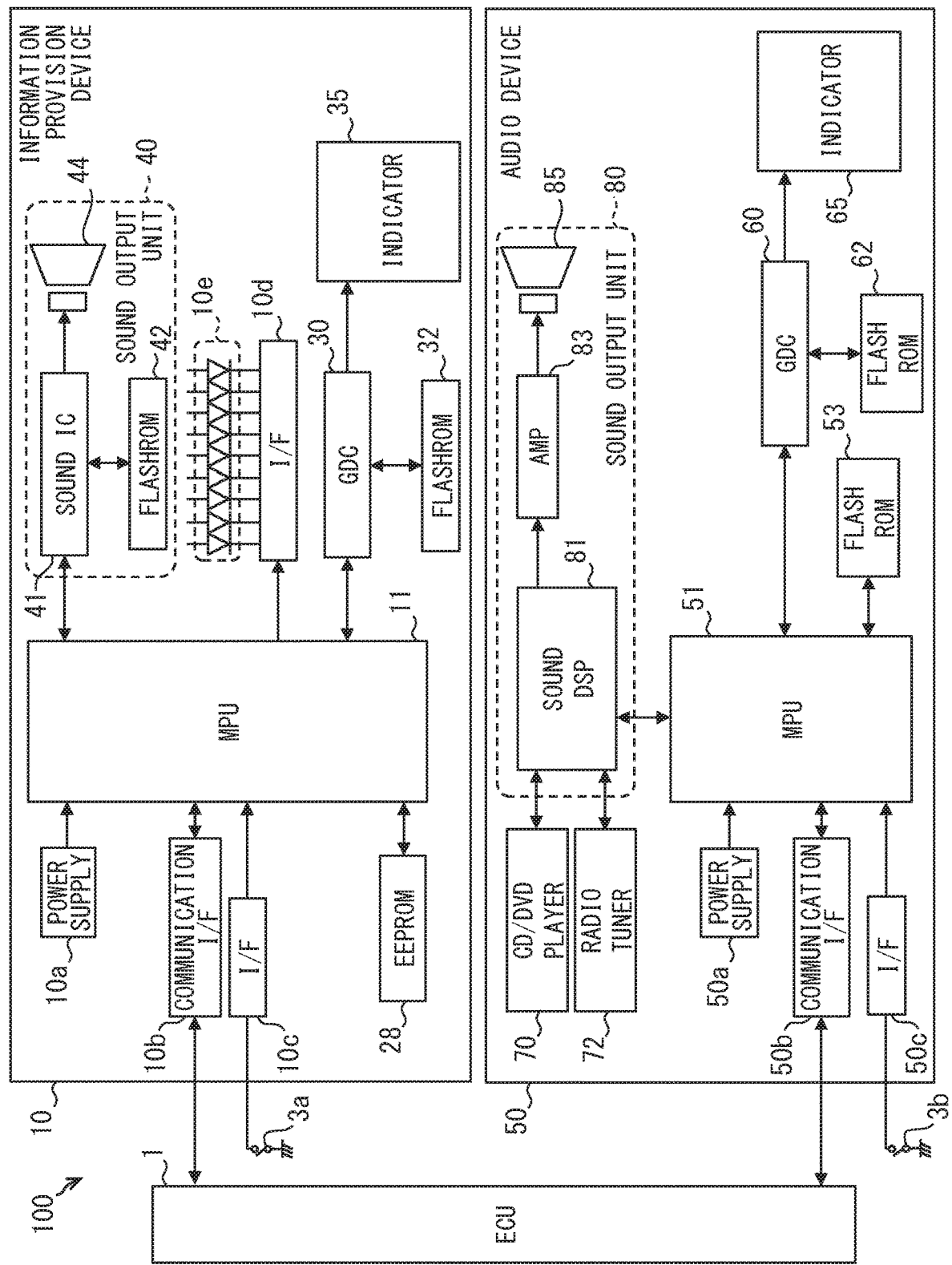
FIG. 1 is a block diagram illustrating a schematic configuration of a vehicle information provision system according to a first embodiment.

For example, a vehicle information provision device is known. A device includes a sound output unit formed to be capable of outputting a sound information item. When there is a need to simultaneously provide a plurality of sound information items, the device determines a priority of each sound information item and gives a specified output value to a sound information item having a high priority. The device allows a sound information item having a low priority to be given an output value smaller than that of the sound information item having the high priority and outputs each sound information item to an internal sound output unit.

The configuration focuses on decreasing an output value for sound information item having the low priority. Depending on the degree of decreasing the output value, it may be difficult to hear sound information item having the low priority. There may be a case of unsuccessfully providing a plurality of sound information items in a favorable state.

An example embodiment of the present disclosure provides a vehicle information provision device. The vehicle information provision device is mounted on a vehicle and provides information. The vehicle information provision device includes a device-side sound output unit, a necessity determination unit, and a sound output control unit. The device-side sound output unit outputs at least one sound information item out of a plurality of sound information items. The necessity determination unit determines whether the plurality of sound information items related to the vehicle are necessary to be provided. The sound output control unit requests a vehicle-side sound output unit outside the vehicle information provision device to output at least one sound information item out of the plurality of sound information items when the necessity determination unit determines that the plurality of sound information items are necessary to be simultaneously provided.

In the example embodiment of the present disclosure, the vehicle information provision device requests the vehicle-side sound output unit to output the at least one sound information item out of the plurality of sound information items when it is necessary to simultaneously provide the plurality of sound information items related to the vehicle. The vehicle-side sound output unit is disposed outside the device and capable of outputting the sound information item. Namely, some of the plurality of sound information items are separately output to the device-side sound output unit provided in the device and the vehicle-side sound output unit provided apart from the device-side sound output unit. The respective sound output units can provide sound information items. It is possible to inhibit a state where some of the sound information items cannot be provided or some of the sound information item cause too low sound pressure and are hardly audible. Therefore, it is possible to favorably provide a plurality of sound information items.

Another example embodiment of the present disclosure provides a vehicle information provision system. The vehicle information provision system is mounted on a vehicle and provides information. The vehicle information provision system includes a first sound output unit, a second sound output unit, a necessity determination unit, and a sound output control unit. The first sound output unit outputs at least one sound information item out of a plurality of sound information items. The second sound output unit is provided separately from the first sound output unit and outputs at least one sound information item out of the plurality of sound information items. The necessity determination unit determines whether the plurality of sound information items related to the vehicle are necessary to be provided. The sound output control unit requests the first sound output unit to output the at least one sound information item out of the plurality of sound information items and requests the second sound output unit to output the at least one sound information item out of the plurality of sound information items different from the at least one sound information item out of the plurality of sound information items requested to be output from the first sound output unit when the necessity determination unit determines that the plurality of sound information items are necessary to be simultaneously provided.

In the example embodiment of the present disclosure, the vehicle information provision system requests the first sound output unit to output the at least one sound information item out of the plurality of sound information items and the second sound output unit to output the other sound information item when it is necessary to simultaneously provide the plurality of sound information items related to the vehicle. The plurality of sound information items are output from the first sound output unit and the second sound output unit provided separately from the first sound output unit. The respective sound output units can provide sound information items. It is possible to inhibit a state where some of the sound information items cannot be provided or some of the sound information item cause too low sound pressure and are hardly audible. Therefore, it is possible to favorably provide a plurality of sound information items.

Another example embodiment of the present disclosure provides a vehicle information provision device. The vehicle information provision device is mounted on a vehicle, provides information, and communicates with a mobile terminal including a terminal-side sound output unit that outputs at least one sound information item out of a plurality of sound information items. The vehicle information provision device includes a device-side sound output unit, a necessity determination unit, and a sound output control unit. The device-side sound output unit outputs at least one sound information item out of a plurality of sound information items. The necessity determination unit determines whether the plurality of sound information items related to the vehicle are necessary to be provided. The sound output control unit requests the terminal-side sound output unit to output the at least one sound information item out of the plurality of sound information items when the necessity determination unit determines that the plurality of sound information items are necessary to be simultaneously provided.

In the example embodiment of the present disclosure, the vehicle information provision device requests the terminal-side sound output unit to output the at least one sound information item out of the plurality of sound information items when it is necessary to simultaneously provide the plurality of sound information items related to the vehicle. The terminal-side sound output unit is included in the mobile terminal and capable of outputting the sound information item. Namely, some of the plurality of sound information items are separately output to the device-side sound output unit provided in the device and the terminal-side sound output unit provided apart from the device-side sound output unit. The respective sound output units can provide sound information items. It is possible to inhibit a state where some of the sound information items cannot be provided or some of the sound information item cause too low sound pressure and are hardly audible. Therefore, it is possible to favorably provide a plurality of sound information items.

The description below explains embodiments based on the accompanying drawings. The same reference numerals may be used for the mutually corresponding elements in the embodiments to omit a duplicate description. When a subsequent embodiment describes only part of the configuration, the other part of the configuration applies to the corresponding part of the configuration described in the preceding embodiment. Combinations of the configurations are not limited to those explicitly described in the embodiments. The configurations of the embodiments may be partially combined, even if not explicitly described, except an invalid combination.

First Embodiment

A vehicle information provision system 100 according to a first embodiment of the present disclosure is mounted on a vehicle and provides various types of information for an occupant of the vehicle. Various types of information include a visual information item and a sound information item. As illustrated in FIG. 1, the vehicle information provision system 100 mainly includes an electronic control device 1, a vehicle information provision device 10, and an audio device 50.

The electronic control device 1 is also generally called an Electronic Control Unit (ECU). The electronic control device 1 is mainly configured as an electronic circuit including at least one processor, a memory, and an input/output interface mounted on a substrate. The processor can perform various processes by executing a computer program stored in the memory, for example. The electronic control device 1 can communicate with a vehicle system, the vehicle information provision device 10, the audio device 50, and the like via the input/output interface and an interior network such as an in-vehicle Local Area Network (LAN).

The electronic control device 1 acquires information about the vehicle from the vehicle system as needed. For example, the information about the vehicle includes information about operating states (vehicle status) of various devices on the vehicle such as information representing the current vehicle speed and information representing steering angle as well as information representing the vicinity of the vehicle.

The vehicle information provision device 10 is also generally called a vehicle meter. The vehicle information provision device 10 mainly includes a MPU (micro processing unit) 11, a GDC (graphics display controller) 30, an indicator 35, and a sound output unit 40. These components are housed in a casing.

The MPU 11 provides an arithmetic processing unit that is supplied with power from a power supply (PS) 10a and mainly controls the indicator 35 and the sound output unit 40 in the vehicle information provision device 10. The MPU 11 is mainly configured as an electronic circuit including at least one processor, a memory, and an input/output interface mounted on a substrate. The processor can perform various processes by executing a computer program stored in the memory. To perform these processes, the MPU 11 can use data and a computer program stored in a non-volatile memory 28 such as electrically erasable programmable read-only memory (EEPROM) (registered trademark).

The MPU 11 can communicate with the electronic control device 1 via a communication interface (I/F) 10b. The MPU 11 is electrically connected to a switch (SW) 3a such as a vehicle ignition switch via an interface 10c. The MPU 11 is electrically connected to a plurality of light-emitting elements provided for an illumination unit 10e via an interface (I/F) 10d. For example, the illumination unit 10e configures an indicating light in the vehicle information provision device 10. The MPU 11 provides control to turn on and off the light-emitting elements. The MPU 11 is also electrically connected to the GDC 30 and a sound IC 41 of the sound output unit 40.

The GDC 30 provides a controller to control the display of the indicator 35. The GDC 30 is mainly configured as an electronic circuit including at least one processor, a memory, and an input/output interface mounted on a substrate. The processor can perform various processes by executing a computer program stored in the memory. To perform these processes, the GDC 30 can use data and a computer program stored in a non-volatile memory 32 such as flash ROM.

For example, the indicator 35 is placed at the part of an instrument panel of the vehicle, the part being opposite a driver's seat. The indicator 35 according to the present embodiment uses a two-dimensionally arrayed, transmissive active-matrix liquid crystal panel using a thin film transistor (TFT). The indicator may use a segment liquid crystal panel, an organic EL display, or a vacuum fluorescent display (VFD), for example.

The indicator 35 provides an occupant with visual information by displaying an image corresponding to an electric signal from the GDC 30.

The sound output unit 40 mainly includes the sound IC 41 and a speaker 44. The sound output unit 40 can output a sound information item to a vehicle occupant. More specifically, the speaker 44 can sound a sound pattern as the sound information item toward the occupant.

Based on a digital signal output from the MPU 11, the sound IC 41 generates an analog signal corresponding to the sound information item sounded from the speaker 44. To generate these signals, the sound IC 41 can use data and a computer program stored in a non-volatile memory 42 such as flash ROM. The analog signal generated from the sound IC 41 is amplified by an amplifier included in the sound IC 41 and then is supplied to the speaker 44. The amplifier provides an electric circuit that outputs a voltage or a current proportion to the input signal.

The speaker 44 sounds the sound information item by using a voice coil and a diaphragm to convert the analog signal supplied from the sound IC 41 into physical vibration.

The sound IC 41 and the speaker 44 are each given an output limit. The output limit for the sound IC 41 is set to an output value belonging to the range that permits a noise likely to occur due to the amplification of the built-in amplifier or prevents the circuit from being damaged. Therefore, sound distortion or clipping noise may remarkably occur if an output value after amplification exceeds the output limit for the sound IC 41. The output limit for the speaker 44 is set to an output value belonging to the range that prevents internal parts such as a voice coil from being damaged. An internal part may be damaged if an output value supplied to the speaker 44 exceeds the output limit. The output limit for the sound output unit 40 as a whole uses the output limit for the sound IC 41 or the output limit for the speaker 44, whichever is smaller. According to the present embodiment, the output limit for the sound IC 41 is smaller than the output limit for the speaker 44. Therefore, the output limit for the sound output unit 40 uses the output limit for the sound IC 41.

The output value here originally signifies the maximum voltage for an analog signal applied to the speaker 44. According to the present embodiment, however, the output value is comparable to a value resulting from converting the maximum voltage into sound pressure generated from the speaker 44. The output limit corresponding to the output value is also comparable to a value converted into the sound pressure. An output value is hereinafter simply denoted as sound pressure.

The vehicle information provision device 10 provides various types of information for a vehicle occupant. Compared to the audio device 50, the vehicle information provision device 10 tends to provide information highly related to vehicle travel.

The indicator 35 of the vehicle information provision device 10 provides visual information representing vehicle states (vehicle status) such as vehicle speed, engine speed, remaining fuel, engine coolant temperature, current values of an electric motor, mileage, and vehicle anomalies. The indicator 35 provides the other types of visual information such as alarm, road information, visibility support information, time, or electronic mail.

The sound output unit 40 of the vehicle information provision device 10 provides the sound information item such as alert sound prompting to wear a seat belt, hazard sound notifying flash of a hazard indicator, and reverse sound notifying that a gear shift lever is positioned to reverse.

The audio device 50 mainly includes a micro processing unit (MPU) 51, a graphics display controller (GDC) 60, an indicator 65, a CD/DVD player 70, a radio tuner 72, and a sound output unit 80.

The MPU 51 provides an arithmetic processing control unit that is supplied with power from a power supply (PS) 50a in the audio device 50 and mainly controls the indicator 65 and the sound output unit 80. The MPU 51 is mainly configured as an electronic circuit including at least one processor, a memory, and an input/output interface mounted on a substrate. The processor can perform various processes by executing a computer program stored in the memory. To perform these processes, the MPU 51 can use data and a computer program stored in a non-volatile memory 53 such as flash ROM.

The MPU 51 can communicate with the electronic control device 1 via a communication interface (I/F) 50b. The MPU 51 is electrically connected to a switch (SW) 3b via an interface 50c. The MPU 51 is also electrically connected to the GDC 60 and a sound digital signal processor (DSP) 81 of the sound output unit 80.

The GDC 60 provides a controller that controls the display of the indicator 65. The GDC 60 is mainly configured as an electronic circuit including at least one processor, a memory, and an input/output interface mounted on a substrate. The processor can perform various processes by executing a computer program stored in the memory. To perform these processes, the GDC 60 can use data and a computer program stored in a non-volatile memory 62 such as flash ROM.

The GDC 60 is electrically connected to the MPU 51 and the indicator 65 and controls the display of the indicator 65 in response to an electric signal from the MPU 51.

For example, the indicator 65 is placed at the center of the instrument panel of the vehicle between the driver's seat and a passenger seat. The indicator 65 according to the present embodiment uses a two-dimensionally arrayed, transmissive active-matrix liquid crystal panel using a thin film transistor (TFT). The indicator 65 may use a segment liquid crystal panel, an organic EL display, or a vacuum fluorescent display (VFD), for example.

The indicator 65 provides an occupant with visual information by displaying an image corresponding to an electric signal from the GDC 60.

For example, the CD/DVD player 70 is placed at the center of the instrument panel of the vehicle between the driver's seat and the passenger seat. The CD/DVD player 70 is electrically connected to the DSP. When an occupant mounts a recording medium such as CD/DVD on a reading unit, for example, the CD/DVD player 70 reads information stored in the recording medium and outputs the information as an electric signal to the DSP 81.

For example, the radio tuner 72 is placed at the center of the instrument panel of the vehicle between the driver's seat and the passenger seat. The radio tuner 72 is electrically connected to the DSP 81, receives a radio broadcast, and outputs information about the radio broadcast as an electric signal to the DSP 81.

The sound output unit 80 mainly includes the DSP 81, an amplifier (AMP) 83, and a speaker 85. The sound output unit 80 can output sound information item to a vehicle occupant. More specifically, the speaker 85 can sound a sound pattern as the sound information item toward the occupant.

The DSP 81 provides an arithmetic processing unit that can fast process digital signals mainly configuring the sound information item. The DSP 81 fast processes an electric signal supplied from the CD/DVD player 70, the radio tuner 72, or the MPU 51 and outputs an analog signal to the amplifier 83.

The amplifier 83 provides an electric circuit that outputs a voltage or a current proportion to an input signal. The amplifier 83 is electrically connected to the DSP 81 and the speaker 85, amplifies an analog signal supplied from the DSP 81, and supplies the signal to the speaker 85.

For example, the speaker 85 is placed at a door panel or a rear quarter panel in the vehicle compartment. The speaker 85 sounds the sound information item by using a voice coil and a diaphragm to convert the analog signal supplied from the DSP 81 into physical vibration.

The amplifier 83 and the speaker 85 use output limits similar to that of the sound output unit 40 of the vehicle information provision device 10. However, these output limits are much larger than that of the sound output unit 40 of the vehicle information provision device 10 due to characteristics of the audio device 50.

The audio device 50 provides various types of information for a vehicle occupant. Compared to the vehicle information provision device 10, the audio device 50 tends to provide information less related to vehicle travel.

The sound output unit 80 of the audio device 50 provides the sound information item such as music information reproduced by the CD/DVD player 70 and information about a radio broadcast received by the radio tuner 72.

The indicator 65 of the audio device 50 provides visual information such as information representing reproduction status of the CD/DVD player 70 and information about reception frequencies of the radio tuner 72.

Figure 2:
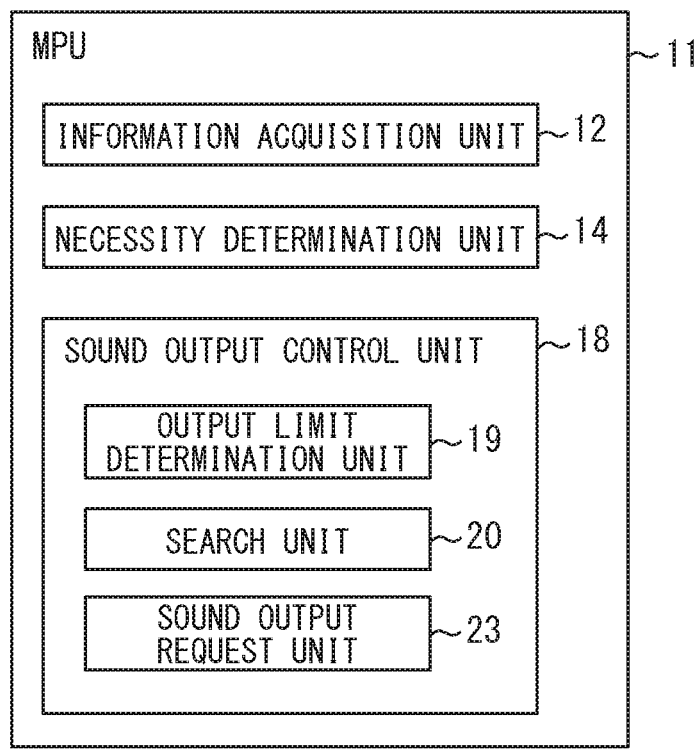
FIG. 2 is a function block diagram illustrating functions of an MPU for a vehicle information provision device according to the first embodiment.

In the vehicle information provision system 100, the MPU 11 executes a program to configure a plurality of function blocks. As illustrated in FIG. 2, the MPU 11 includes function blocks such as an information acquisition unit 12, a necessity determination unit 14, and a sound output control unit 18.

The information acquisition unit 12 acquires various types of information about the vehicle from the electronic control device 1.

The necessity determination unit 14 determines whether the vehicle-related sound information item needs to be provided for an occupant, based on the information acquired by the information acquisition unit 12. When the occupant does not wear the seat belt during the vehicle travel, for example, the necessity determination unit 14 determines that it is necessary to provide the sound information item such as alert sound prompting to wear the seat belt. When the hazard indicator flashes, for example, the necessity determination unit 14 determines that it is necessary to provide the sound information item such as hazard sound. When the gear shift lever is positioned to reverse, for example, the necessity determination unit 14 determines that it is necessary to provide the sound information item such as reverse sound. The necessity determination unit 14 may need not provide any sound information item, may need to provide one type of sound information item, or may need to simultaneously provide a plurality of sound information items.

The sound output control unit 18 controls the sound output unit 40 to output the sound information item and controls the sound output unit 80 to output the sound information item. When the necessity determination unit 14 determines that it is necessary to simultaneously provide a plurality of sound information items, the sound output control unit 18 can request the sound output unit 80 to output at least one of the sound information items. Specifically, the sound output control unit 18 includes subdivided function blocks such as an output limit determination unit 19, a search unit 20, and a sound output request unit 23.

When the necessity determination unit 14 determines that it is necessary to simultaneously provide a plurality of sound information items, the sound output unit 40 may simultaneously output all of the necessary sound information items. In such a case, the output limit determination unit 19 determines whether a virtual sound pressure to be output is estimated to exceed the output limit for the sound output unit 40. This determination can be performed by finding the sum of simply adding default values for the maximum sound pressures of the respective sound information item and comparing the sum with the output limit. Alternatively, the determination can be performed by finding the maximum sound pressure in a synthesized waveform resulting from synthesizing waveforms for the respective sound information item and comparing the maximum sound pressure with the output limit.

The necessity determination unit 14 may determine that it is necessary to simultaneously provide a plurality of sound information items. Besides, when the output limit determination unit 19 determines that the virtual sound pressure exceeds the output limit for the sound output unit 40, the search unit 20 searches for a combination of the sound information items that enables the sound output unit 40 to simultaneously output a plurality of sound information items and keeps the output virtual sound pressure to be lower than or equal to the output limit. The search unit 20 selects the combination of the sound information items that remains smaller than or equal to the output limit.

The combination of sound information items signifies a subset of a set of sound information items. When two sound information items are available, two combinations are practically available. One of sound information items belongs to the combination selected by the search unit 20. When three or more sound information items are available, the total number of combinations increases as the number of sound information items increases. One of sound information items or a plurality of sound information items may belong to the combination selected by the search unit 20.

The necessity determination unit 14 may determine that it is necessary to simultaneously provide a plurality of the sound information items. Besides, when the output limit determination unit 19 determines that the virtual sound pressure for all of the necessary sound information items simultaneously output from the sound output unit 40 exceeds the output limit for the sound output unit 40, the sound output request unit 23 requests the sound output unit 80 to output at least one of the sound information items.

According to the present embodiment, the sound output request unit 23 allows the sound output unit 40 to output a plurality of sound information items belonging to the combination selected by the search unit 20. When the combination selected by the search unit 20 includes a plurality of sound information items, the sound output request unit 23 allows the sound output unit 40 to simultaneously output the sound information items. Namely, the MPU 11 requests the sound IC 41 to output the sound information item included in the combination selected by the search unit 20. The speaker 44 sounds the sound information item based on an analog signal supplied from the sound IC 41.

At the same time, the sound output request unit 23 requests the sound output unit 80 to simultaneously output a plurality of sound information items not belonging to the combination selected by the search unit 20. The sound output request unit 23 issues a request to the sound output unit 80 by allowing the electronic control device 1 to output an electric signal to the MPU 51 of the audio device 50. The MPU 51 requests the DSP 81 to output the sound information item not belonging to the combination selected by the search unit 20. The speaker 85 sounds the sound information item based on an analog signal supplied from the DSP 81.

When the sound output unit 80 outputs another type of sound information item (such as music information), the DSP 81 decreases the sound pressure for the music information and synthesizes the music information and the sound information item not belonging to the combination found by the search unit 20. The speaker 85 simultaneously sounds the music information and the sound information item not belonging to the combination found by the search unit 20. This improves the audibility of sound information item that is highly needed to be provided for occupants.

Figure 3:
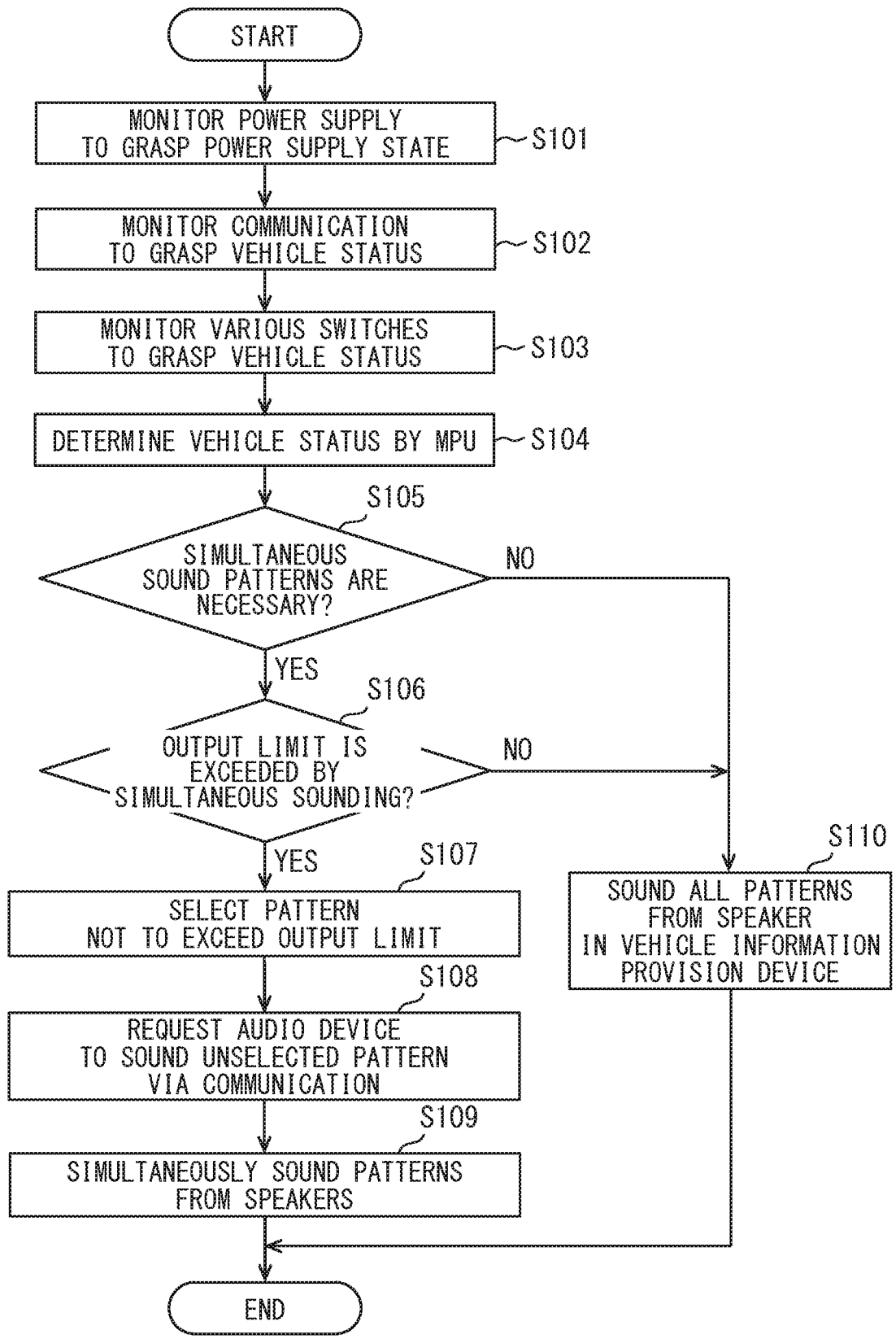
FIG. 3 is a flowchart illustrating the vehicle information provision system according to the first embodiment.

The description below explains a process performed by the vehicle information provision system 100 (mainly the MPU 11) according to the first embodiment based on a flowchart in FIG. 3. A sequence of the process is performed at a specified interval or a specified instance, for example.

In S101, the information acquisition unit 12 in the MPU 11 monitors a power supply 10a to grasp a power supply state. The process proceeds to S102 after S101.

In S102, the information acquisition unit 12 in the MPU 11 monitors communication with the electronic control device 1 to grasp a vehicle status. The process proceeds to S103 after S102.

In S103, the information acquisition unit 12 in the MPU 11 monitors the switch (SW) 3a to grasp a vehicle status. The process proceeds to S104 after S103.

In S104, the necessity determination unit 14 in the MPU 11 determines the necessity to provide the sound information item related to the vehicle based on the vehicle status. The process proceeds to S105 after S104.

In S105, the sound output control unit 18 in the MPU 11 determines whether the necessity determination unit 14 determines the necessity of simultaneously providing a plurality of sound information items. Namely, the sound output control unit 18 determines whether it is necessary to simultaneously sound a plurality of sound patterns. If the determination in S105 is affirmed, the process proceeds to S106. If the determination in S105 is negated, the process proceeds to S110.

In S106, the output limit determination unit 19 in the MPU 11 determines whether a virtual sound pressure to be necessarily output is estimated to exceed the output limit for the sound output unit 40 when the sound output unit 40 simultaneously outputs all the necessary sound information item. If the determination in S106 is affirmed, the process proceeds to S107. If the determination in S106 is negated, the process proceeds to S110.

In S107, the search unit 20 in the MPU 11 searches for a combination of the sound information items that enables the sound output unit 40 to simultaneously output a plurality of sound information items and keeps the output virtual sound pressure to be lower than or equal to the output limit. The search unit 20 selects the combination of the sound information items that remains smaller than or equal to the output limit. Namely, the process selects one of the sound patterns not to exceed the output limit. The process proceeds to S108 after S107.

In S108, the sound output request unit 23 in the MPU 11 requests the sound output unit 40 to output a plurality of sound information items configuring the combination selected by the search unit 20 and requests the sound output unit 80 to simultaneously output a plurality of sound information items not belonging to the combination selected by the search unit 20. Namely, the communication requests the audio device 50 to sound a sound pattern not selected in S107. The process proceeds to S109 after S108.

In S109, the sound output unit 40 outputs the sound information items configuring the combination selected by the search unit 20 corresponding to the process in S108. Besides, the sound output unit 80 outputs the sound information items not belonging to the combination selected by the search unit 20. The speakers 44 and 85 simultaneously sound a plurality of sound patterns. S109 terminates the sequence of the process.

The process proceeds to S110 if the determination in S105 or S106 is negated. In S110, the sound output request unit 23 in the MPU 11 allows the sound output unit 40 to simultaneously output a plurality of sound information items.

Namely, the speaker 44 in the vehicle information provision device 10 sounds all the sound patterns. S110 terminates the sequence of the process.

According to the first embodiment, the sound output unit 40 provided in the vehicle information provision device 10 is comparable to a "device-side sound output unit", a "first sound output unit" and a "device-side speaker". The sound output unit 80 provided for the audio device 50 outside the vehicle information provision device 10 is comparable to a "vehicle-side sound output unit", a "second sound output unit", and a "vehicle-side speaker". The "device-side" signifies that the viewpoint is placed at the vehicle information provision device 10. The "vehicle-side" is opposite to the "device-side" and signifies that the viewpoint is placed at the vehicle viewed from the vehicle information provision device 10.

(Operation and Effect)

The description below explains the operation and effect of the above-described first embodiment.

When it is necessary to simultaneously provide a plurality of sound information items related to the vehicle, the vehicle information provision device 10 according to the first embodiment issues a request to output at least one of sound information items from the sound output portion 80 formed to be capable of outputting the sound information item outside the device. The plurality of sound information items are separately output to the sound output portion 40 provided in the vehicle information provision device 10 and the sound output portion 80 provided apart from the sound output portion 40. The sound output portions 40 and 80 can provide the sound information items. It is possible to inhibit a situation where some of the sound information items cannot be provided or some of the sound information items cause too low sound pressure and are hardly audible. Therefore, it is possible to favorably provide a plurality of sound information items.

According to the first embodiment, when the sound output unit 40 simultaneously outputs a plurality of sound information items needed to be provided, and the output virtual sound pressure is estimated to exceed the output limit for the sound output unit 40, the sound output unit 80 is requested to output at least one of the sound information items. It is possible to inhibit the sound output unit 40 from causing the sound pressure exceeding the output limit. It is possible to avoid excess in the output limit and favorably provide a plurality of sound information items for a long time.

According to the first embodiment, when the sound output unit 40 may simultaneously output a plurality of sound information items needed to be provided, and the output virtual sound pressure is estimated to exceed the output limit for the sound output unit 40, a search is made to find a combination that allows the sound pressure to be lower than or equal to the output limit in the case of the simultaneous output. The sound output unit 40 simultaneously outputs the sound information items configuring the selected combination. It is possible to inhibit from outputting from being unnecessarily allocated to the sound output unit 80. It is possible to decrease loads on the sound output unit 80 and favorably provide a plurality of sound information items.

According to the first embodiment, when the sound output unit 40 simultaneously outputs a plurality of sound information items needed to be provided, and the output virtual sound pressure is lower than or equal to the output limit for the sound output unit 40, the sound output unit 40 outputs the plurality of sound information items. It is possible to inhibit from outputting from being unnecessarily allocated to the sound output unit 80. It is possible to decrease loads on the sound output unit 80 and favorably provide a plurality of sound information items.

When it is necessary to simultaneously provide a plurality of sound information items related to the vehicle, the vehicle information provision system 100 according to the first embodiment requests the first sound output unit 40 to output at least one of a plurality of sound information items and requests the second sound output unit 80 to output another one of the plurality of sound information items. The sound information items are separately output form the sound output unit 40 and the sound output unit 80 provided apart from the sound output unit 40. The sound output units 40 and 80 can provide the sound information items. It is possible to inhibit a status where some of the sound information items cannot be provided or some of the sound information items cause too low sound pressure and are hardly audible. It is possible to favorably provide a plurality of sound information items.

According to the first embodiment, when the sound output unit 40 simultaneously outputs a plurality of sound information items needed to be provided, and the output virtual sound pressure is estimated to exceed the output limit for the sound output unit 40, the sound output unit 80 is requested to output at least one of the sound information items. It is possible to inhibit the sound output unit 40 from causing the sound pressure exceeding the output limit. It is possible to avoid excess in the output limit and favorably provide a plurality of sound information items for a long time.

Second Embodiment

Figure 4:
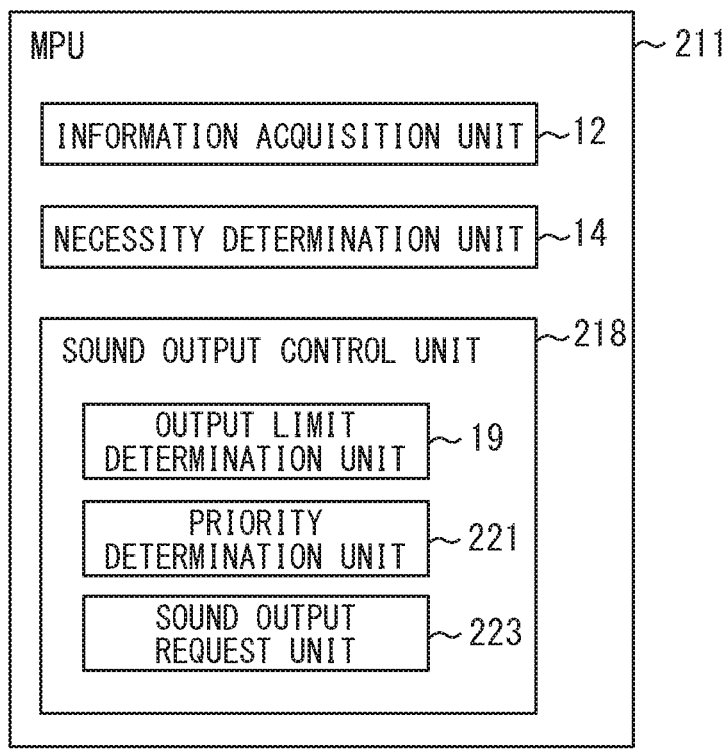
FIG. 4 is a function block diagram illustrating functions of an MPU for a vehicle information provision device according to a second embodiment.
Figure 5:
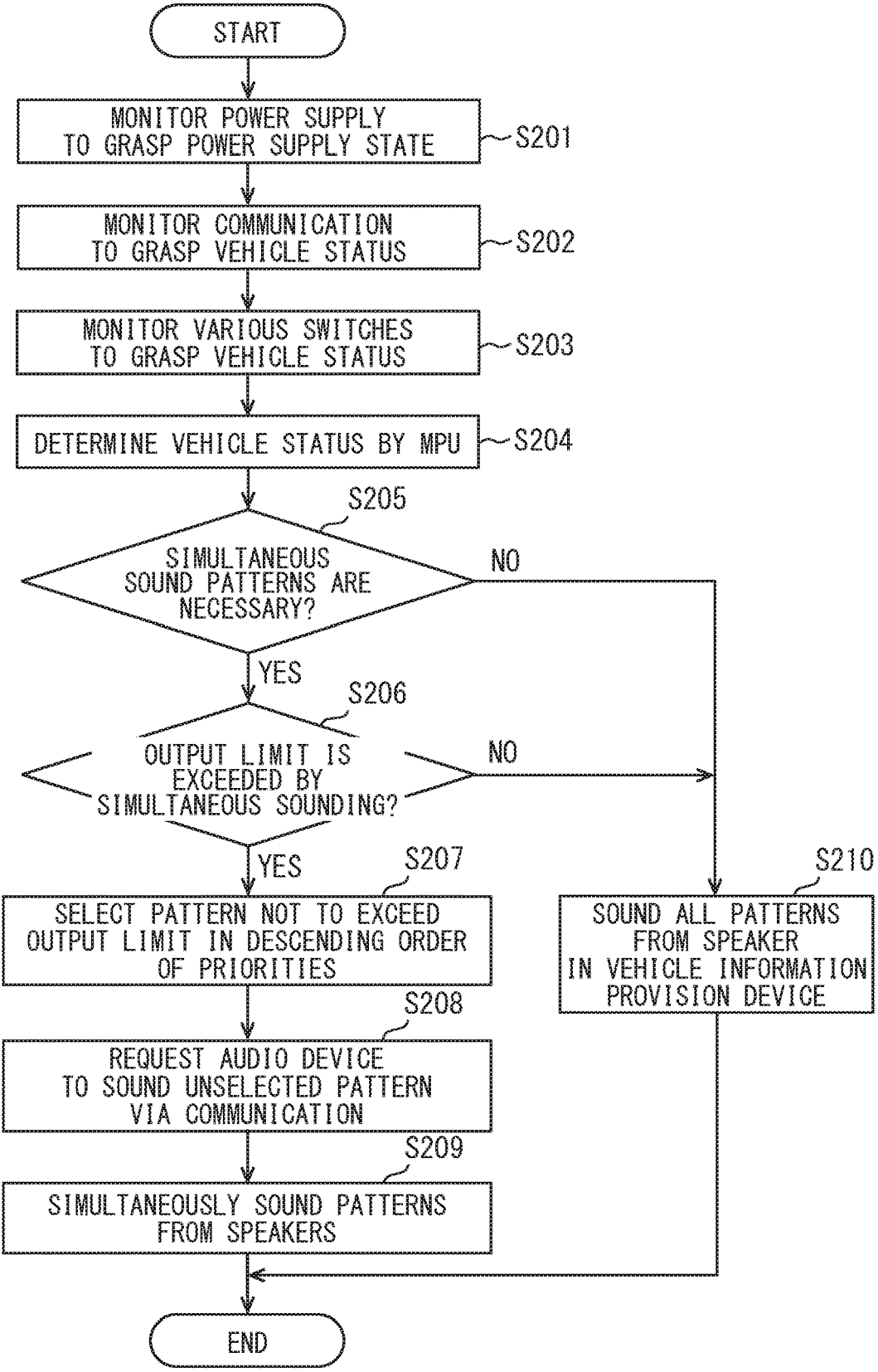
FIG. 5 is a flowchart illustrating a vehicle information provision system according to the second embodiment.

As illustrated in FIGS. 4 and 5, the second embodiment is a modification of the first embodiment. The description below explains the second embodiment mainly in terms of differences from the first embodiment.

As illustrated in FIG. 4, the vehicle information provision device 10 according to the second embodiment includes an MPU 211 including a sound output control unit 218 that further includes a priority determination unit 221 as a function block instead of the search unit 20 according to the first embodiment.

The necessity determination unit 14 may determine that it is necessary to simultaneously provide a plurality of sound information items. Besides, the output limit determination unit 19 may determine that the virtual sound pressure exceeds the output limit for the sound output unit 40. In such a case, the priority determination unit 221 compares and determines priorities of the sound information items and selects the sound information item having the high priority.

Priorities of the sound information items are predetermined in a priority table provided as data that associates the sound information item with a priority and is stored in the memory of the MPU 211, for example. Reference to the priority table enables the priority determination unit 221 to select the sound information item having the high priority.

The selection is performed on condition that the sound output unit 40 outputs the selected sound information item and keeps the output virtual sound pressure to be lower than or equal to the output limit. For example, there are three or more sound information items. The sound output unit 40 simultaneously outputs two sound information items in descending order of priorities and causes the virtual sound pressure to be lower than or equal to the output limit. Meanwhile, the sound output unit 40 simultaneously outputs three sound information items in descending order of priorities and causes the virtual sound pressure to exceed the output limit. Then, the two sound information items in descending order of priorities are to be selected because the output virtual sound pressure remains lower than or equal to the output limit.

The description below explains a process performed by the vehicle information provision system 100 (mainly the MPU 211) according to the second embodiment based on a flowchart in FIG. 5. A sequence of the process is performed at a specified interval or a specified instance, for example.

S201 through S206 are comparable to S101 through S106 in the first embodiment. If the determination in S206 is affirmed, the process proceeds to S207.

In S207, the priority determination unit 221 in the MPU 211 selects the sound information item having the high priority on condition that the output virtual sound pressure remains lower than or equal to the output limit. Namely, sound patterns are selected in descending order of priorities not to exceed the output limit. The process proceeds to S208 after S207.

In S208, a sound output request unit 223 in the MPU 211 requests the sound output unit 40 to output a plurality of sound information items (sound information item having the high priority) selected by the priority determination unit 221 and requests the sound output unit 80 to simultaneously output a plurality of sound information items (sound information item having the low priority) other than those selected by the priority determination unit 221. Namely, the communication requests the audio device 50 to sound a sound pattern not selected in S207. The process proceeds to S209 after S208.

S209 and S210 are comparable to S109 and S110 in the first embodiment.

According to the second embodiment, when the sound output unit 40 simultaneously outputs a plurality of sound information items needed to be provided, and the output virtual sound pressure is estimated to exceed the output limit for the sound output unit 40, the sound output unit 40 outputs a plurality of sound information items on condition that sound information item having the high priority remains lower than or equal to the output limit. The sound information item having the high priority is output from the sound output unit 40 in the vehicle information provision device 10 to which sound information item related to the vehicle is output. It is possible to allow an occupant to reliably identify that the sound information item is related to the vehicle. The sound output unit 80 outputs the sound information item having the low priority. The sound output units 40 and 80 can provide the sound information item. It is possible to inhibit a status where some of the sound information items cannot be provided or some of the sound information items cause too low sound pressure and are hardly audible. It is possible to favorably provide a plurality of sound information items.

Third Embodiment

Figure 6:
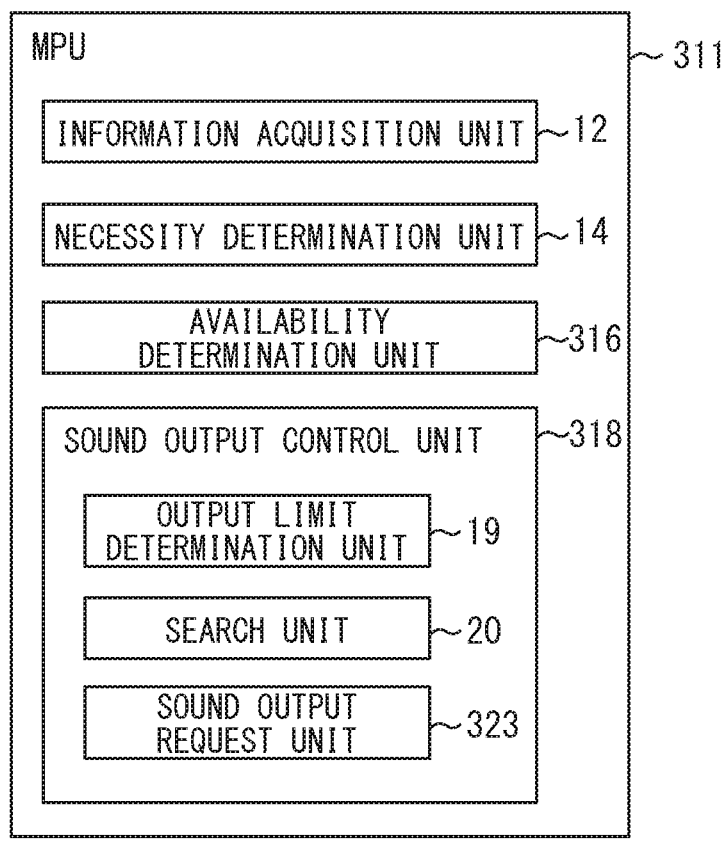
FIG. 6 is a function block diagram illustrating functions of an MPU for a vehicle information provision device according to a third embodiment.
Figure 7:
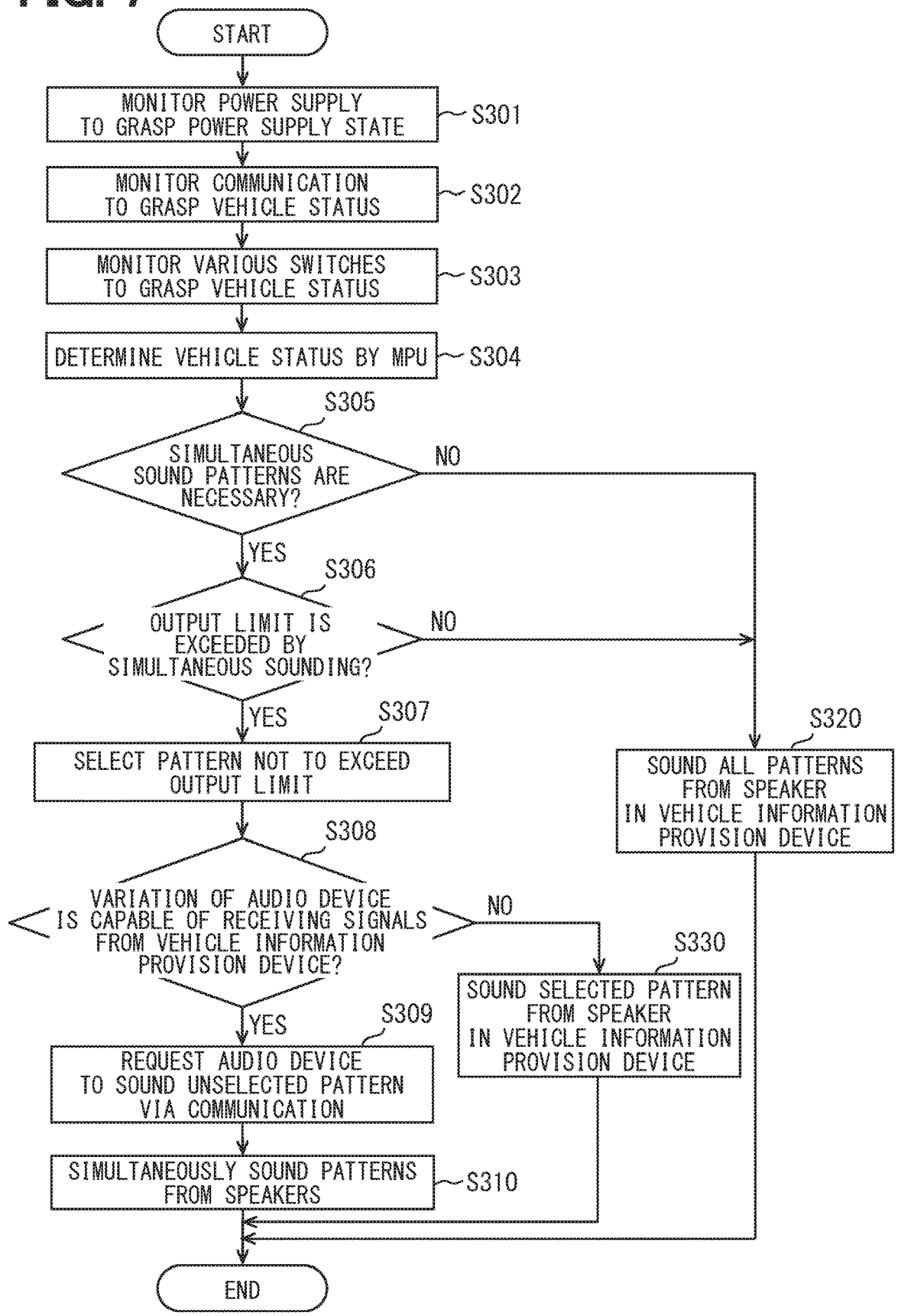
FIG. 7 is a flowchart illustrating a vehicle information provision system according to the third embodiment.

As illustrated in FIGS. 6 and 7, the third embodiment is a modification of the first embodiment. The description below explains the third embodiment mainly in terms of differences from the first embodiment.

An MPU 311 in the vehicle information provision device 10 according to the third embodiment further includes an availability determination unit 316 as a function block. The availability determination unit 316 determines whether there is another sound output unit, different from the sound output unit 40, which can communicate with a sound output control unit 318 and can output the sound information item in response to the sound output control unit 318.

For example, when an audio device is not supplied with the vehicle information provision device 10 at a vehicle factory and is installed later, the audio device may not be able to respond to a request from a sound output request unit 323 of the MPU 311. When the audio device cannot respond to a request from the sound output request unit 323, the availability determination unit 316 determines that the corresponding sound output unit is unavailable. When a communication error occurs between the MPU 311 and the audio device 50, the availability determination unit 316 determines that the corresponding sound output unit is unavailable.

Specifically, the availability determination unit 316 can determine whether the corresponding sound output unit is available by referencing data representing results of information acquisition from the information acquisition unit 12 and vehicle variations (such as information about vehicle types and onboard devices) stored in the memory 28.

The description below explains a process performed by the vehicle information provision system 100 (mainly the MPU 311) according to the third embodiment based on a flowchart in FIG. 7. A sequence of the process is performed at a specified interval or a specified instance, for example.

S301 through S307 are comparable to S101 through S107 in the first embodiment. The process proceeds to S308 after S307.

In S308, the availability determination unit 316 in the MPU 311 determines whether there is another sound output unit, different from the sound output unit 40, which can communicate with the sound output control unit 318 and can output the sound information item in response to the sound output control unit 318. Namely, it is determined whether the audio device 50 is a variation capable of receiving signals from the vehicle information provision device 10. If the determination in S308 is affirmed, the process proceeds to S309. If the determination in S308 is negated, the process proceeds to S330.

S309 through S310 are comparable to S108 through S109 in the first embodiment.

The process proceeds to S330 if the determination in S308 is negated. In S330, the sound output request unit 323 in the MPU 311 allows the sound output unit 40 to output a plurality of sound information items configuring the combination selected by the search unit 20. Neither sound output unit 40 nor 80 outputs a plurality of sound information items not belonging to the combination selected by the search unit 20. S330 terminates the sequence of the process.

S320 is comparable to S110 in the first embodiment.

The third embodiment determines whether there is another sound output unit, different from the sound output unit 40, which can communicate with the sound output control unit 318 and can output the sound information item in response to the sound output control unit 318. This determination can avoid an unnecessary request from being issued when there is not a sound output unit that can be requested for output. The sound output unit 40 can smoothly output the sound information item.

Fourth Embodiment

Figure 8:
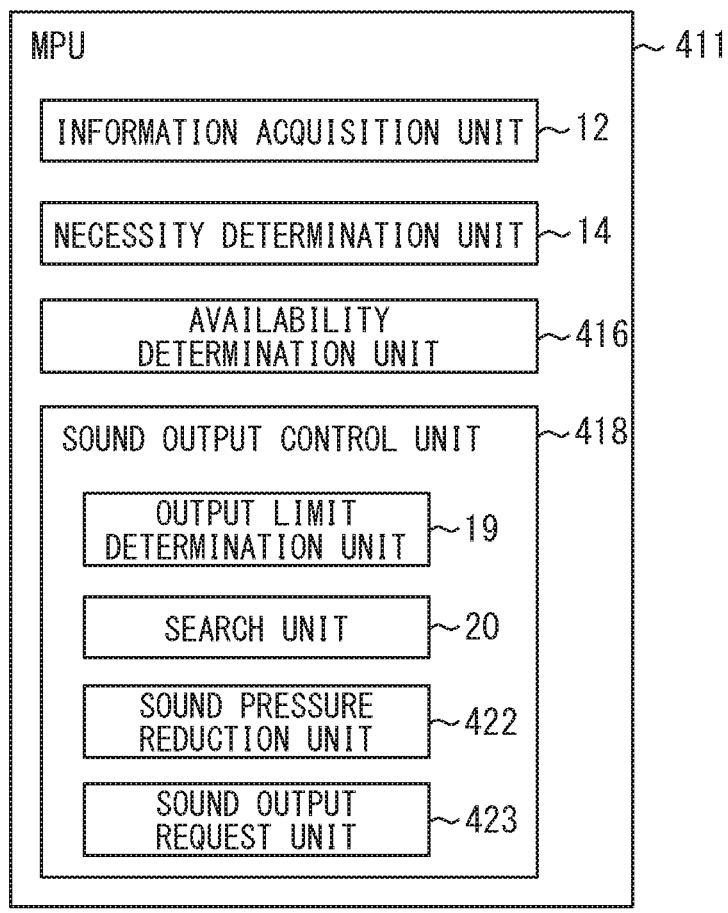
FIG. 8 is a function block diagram illustrating functions of an MPU for a vehicle information provision device according to a fourth embodiment.
Figure 9:
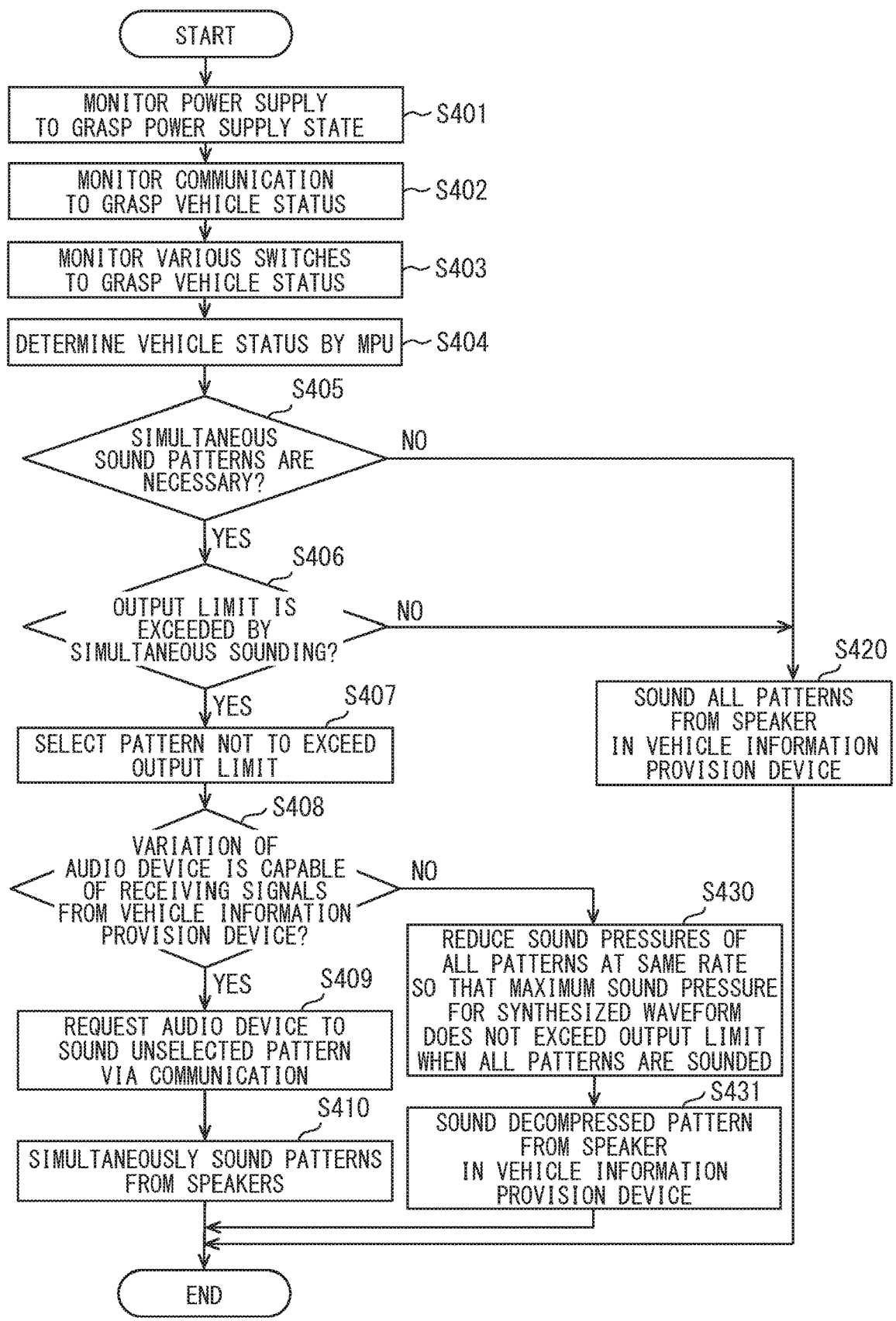
FIG. 9 is a flowchart illustrating a vehicle information provision system according to the fourth embodiment.

As illustrated in FIGS. 8 and 9, the fourth embodiment is a modification of the third embodiment. The description below explains the fourth embodiment mainly in terms of differences from the third embodiment.

As illustrated in FIG. 8, a sound output control unit 418 in an MPU 411 of the vehicle information provision device 10 according to the fourth embodiment further includes a sound pressure reducing unit 422 as a function block.

An availability determination unit 416 may determine that there is not a sound output unit, different from the sound output unit 40, which can communicate with the sound output control unit 418 and can output in response to the sound output control unit 418. In this case, the sound pressure reducing unit 422 settles a reduction rate to reduce sound pressures for a plurality of sound information items at the same rate when the necessity determination unit 14 determines the sound information items as being necessary to be provided.

The description below explains a process performed by the vehicle information provision system 100 (mainly the MPU 411) according to the fourth embodiment based on a flowchart in FIG. 9. A sequence of the process is performed at a specified interval or a specified instance, for example.

S401 through S410 and S420 are comparable to S301 through S310 and S320 in the third embodiment.

The process proceeds to S430 if the determination in S408 is negated. In S430, the sound pressure reducing unit 422 in the MPU settles a reduction rate to reduce sound pressures for a plurality of sound information items at the same rate when the necessity determination unit 14 determines the sound information items as being necessary to be provided. Specifically, when the sound output unit 40 simultaneously sounds all sound patterns, the sound pressure reducing unit 422 reduces the sound pressures of all the sound patterns at the same rate so that the maximum sound pressure for a synthesized waveform does not exceed an output limit. The process proceeds to S431 after S430.

In S431, a sound output request unit 423 in the MPU reduces sound pressures of a plurality of sound information items at the reduction rate settled by the sound pressure reducing unit 422 when the necessity determination unit 14 determines the sound information items as being necessary to be provided. Then, the sound output request unit 423 allows the sound output unit 40 to simultaneously output the sound information items. Namely, the speaker 44 sounds the decompressed sound pattern. S431 terminates the sequence of the process.

When there is not available a sound output unit that is installed separately from the sound output unit 40 and can be requested for output, the fourth embodiment reduces sound pressures of a plurality of sound information items at the same rate and allows the sound output unit 40 to output the sound information item. It is possible to inhibit a status where some of the sound information items cannot be provided or some of the sound information items cause too low sound pressure and are hardly audible. It is possible to favorably provide a plurality of sound information items.

Fifth Embodiment

Figure 10:
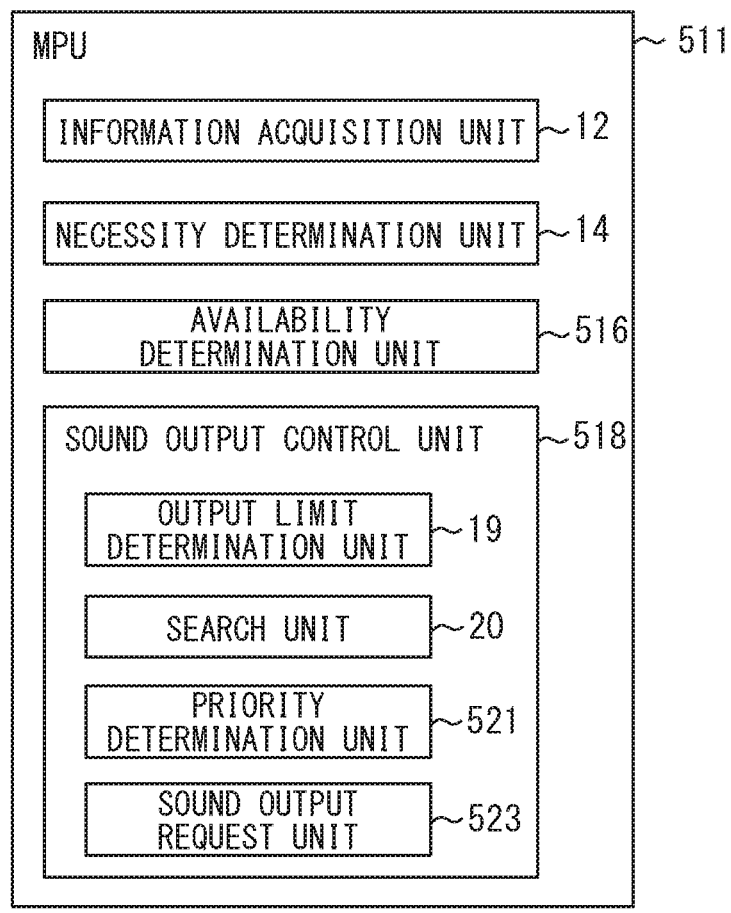
FIG. 10 is a function block diagram illustrating functions of an MPU for a vehicle information provision device according to a fifth embodiment.
Figure 11:
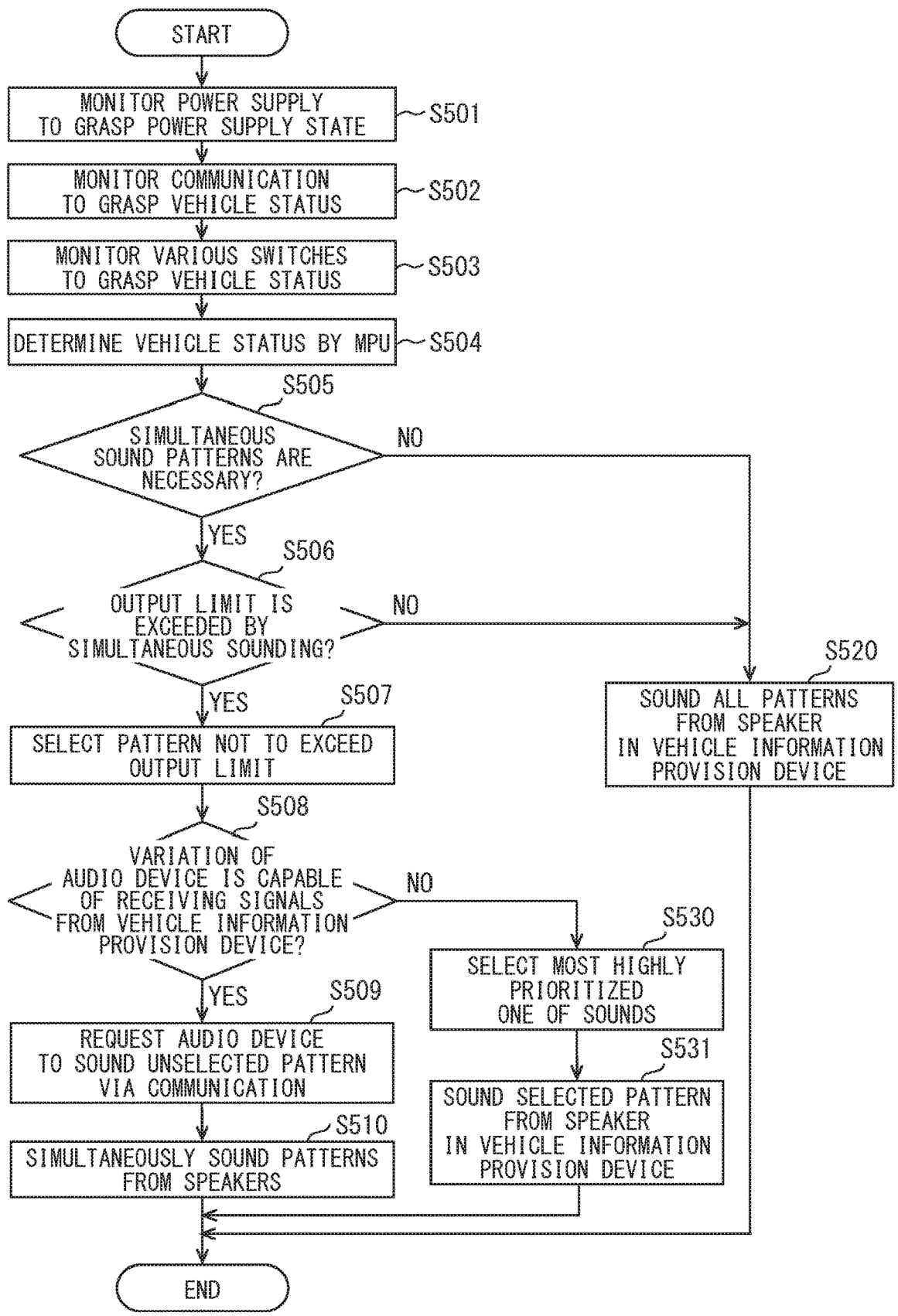
FIG. 11 is a flowchart illustrating a vehicle information provision system according to the fifth embodiment.

As illustrated in FIGS. 10 and 11, the fifth embodiment is a modification of the third embodiment. The description below explains the fifth embodiment mainly in terms of differences from the third embodiment.

As illustrated in FIG. 10, a sound output control unit 518 in an MPU 511 of the vehicle information provision device 10 according to the fifth embodiment further includes a priority determination unit 521 as a function block.

An availability determination unit 516 may determine that there is not a sound output unit, different from the sound output unit 40, which can communicate with the sound output control unit 518 and can output in response to the sound output control unit 518. In this case, the priority determination unit 521 according to the fifth embodiment compares and determines priorities of the sound information items and selects the most sound information item having the high priority.

The description below explains a process performed by the vehicle information provision system 100 (mainly the MPU 511) according to the fifth embodiment based on a flowchart in FIG. 11. A sequence of the process is performed at a specified interval or a specified instance, for example.

S501 through S510 and S520 are comparable to S501 through S510 and S520 in the third embodiment.

The process proceeds to S530 if the determination in S508 is negated. In S530, the priority determination unit 521 in the MPU 511 selects the most sound information item having the high priority out of a plurality of sound information items. The process proceeds to S531 after S530.

In S531, a sound output request unit 523 in the MPU 511 allows the sound output unit 40 to output the sound information item (the most sound information item having the high priority) selected by the priority determination unit 521 out of a plurality of sound information items. S531 terminates the sequence of the process.

When there is not available a sound output unit that is installed separately from the sound output unit 40 and can be requested for output, the fifth embodiment allows the sound output unit 40 to output the sound information item having the high priority. It is possible to inhibit a status where the sound information item having the high priority is hardly audible.

Sixth Embodiment

Figure 12:
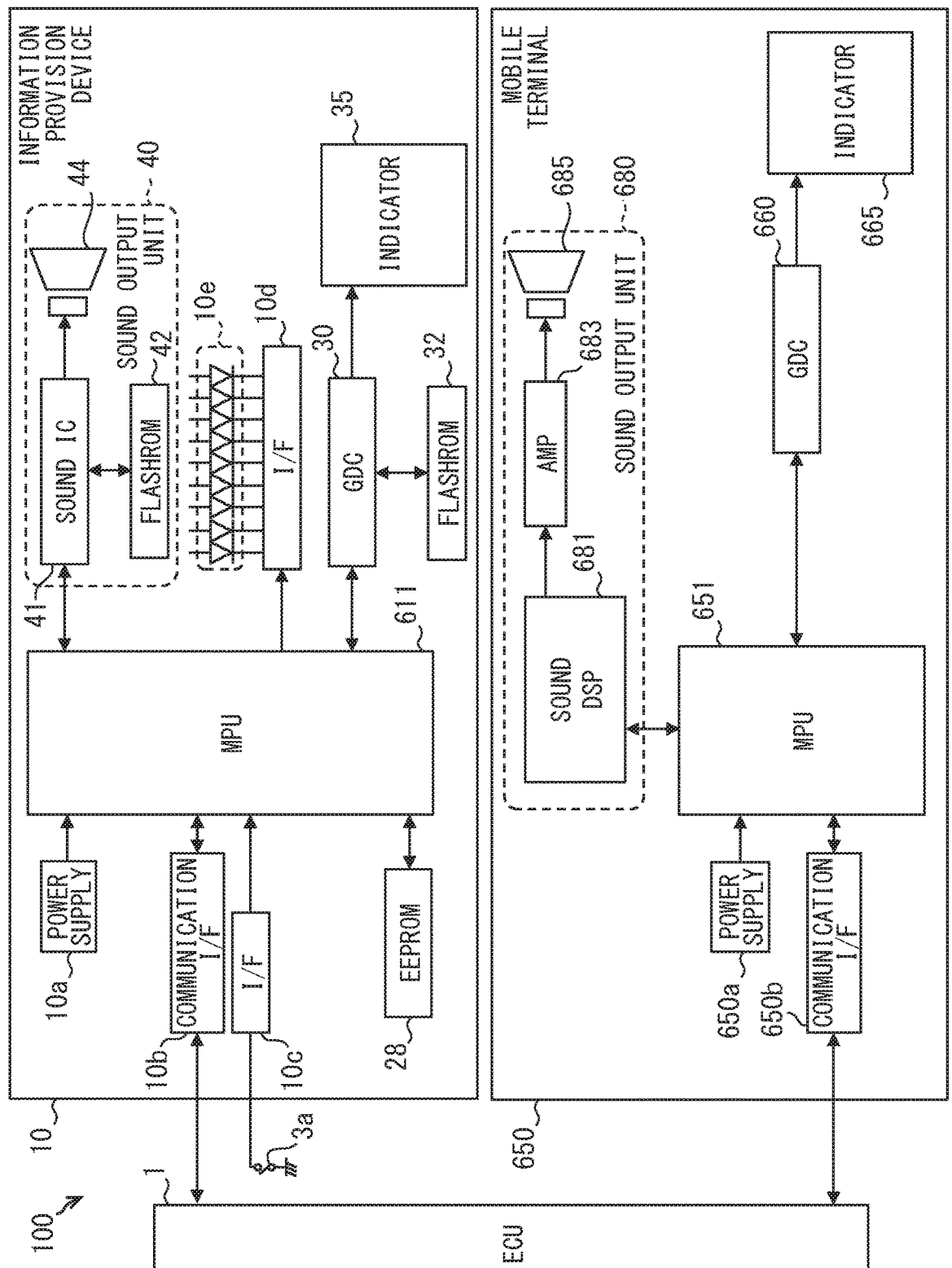
FIG. 12 is a block diagram illustrating a schematic configuration of a vehicle information provision system according to a sixth embodiment.
Figure 13:
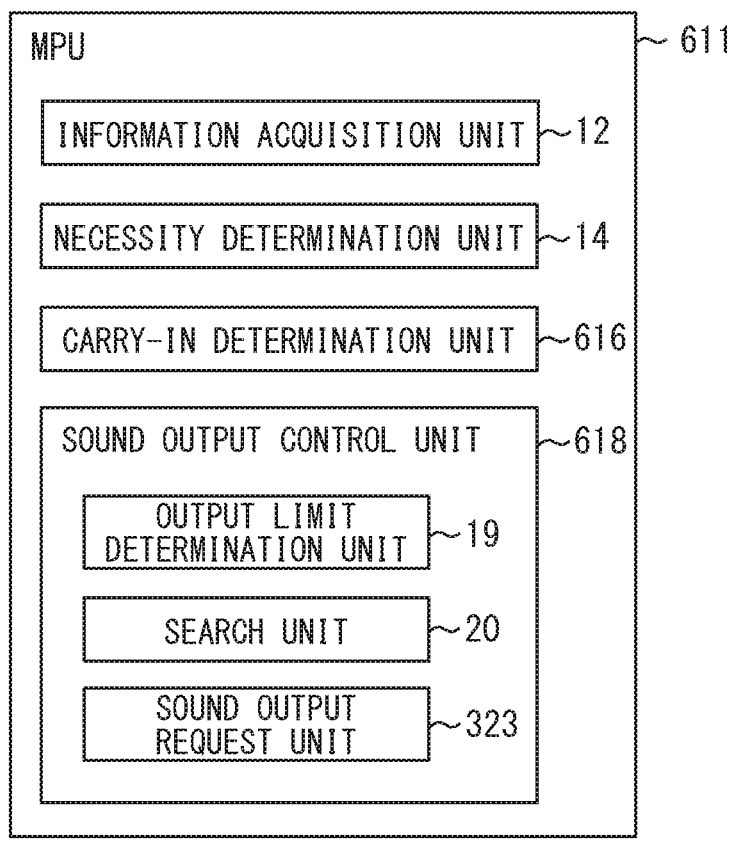
FIG. 13 is a function block diagram illustrating functions of an MPU for a vehicle information provision device according to the sixth embodiment.
Figure 14:
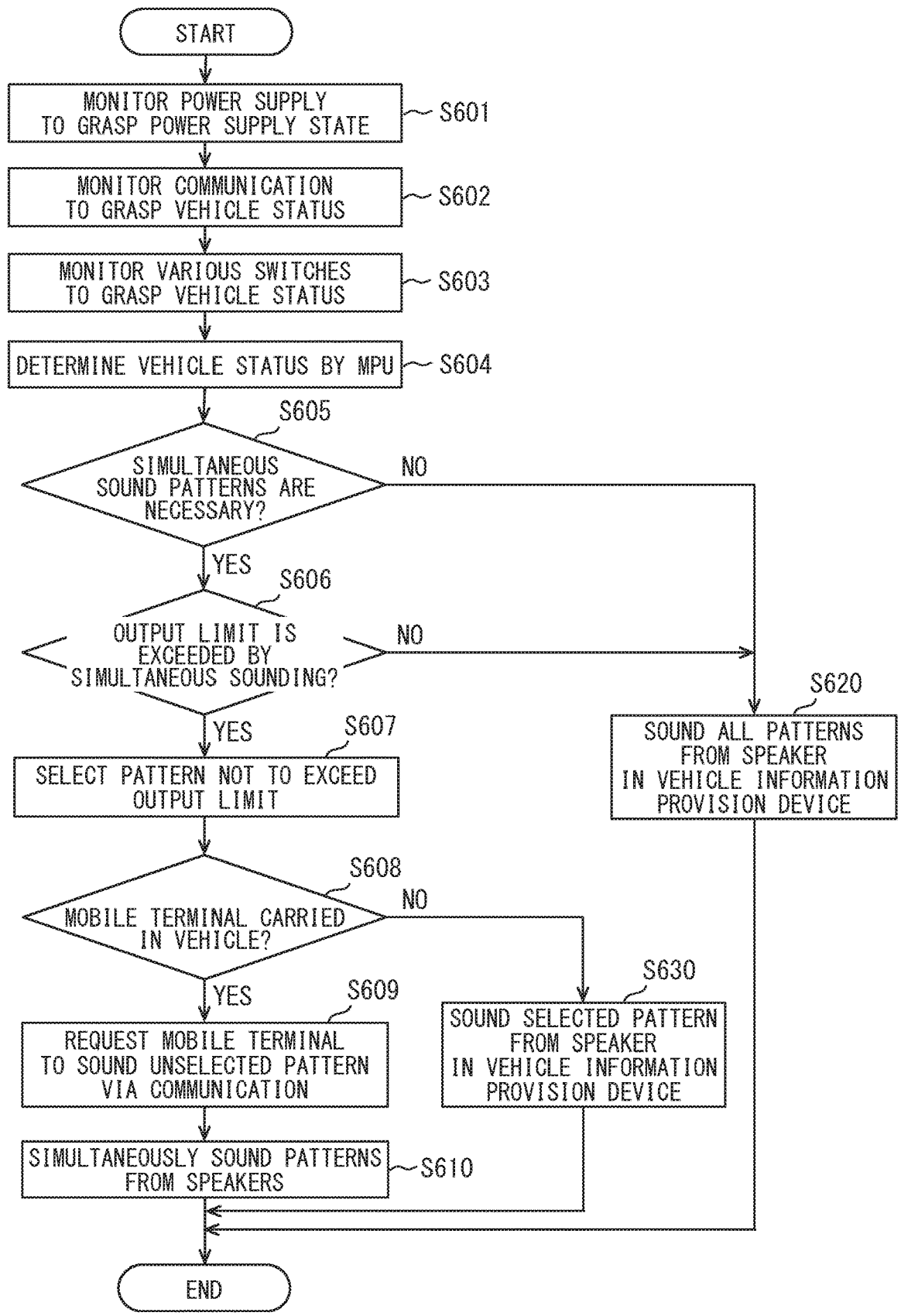
FIG. 14 is a flowchart illustrating the vehicle information provision system according to the sixth embodiment.

As illustrated in FIGS. 12 through 14, the sixth embodiment is a modification of the third embodiment. The description below explains the sixth embodiment mainly in terms of differences from the third embodiment.

The sixth embodiment eliminates the audio device 50. Instead, a sound output control unit 618 distributes output of a plurality of sound information items into the sound output unit 40 provided in the vehicle information provision device 10 and a sound output unit 680 in a mobile terminal 650 carried by a vehicle occupant into the vehicle.

As illustrated in FIG. 12, the mobile terminal 650 is available as a mobile communication terminal such as a smartphone and a tablet terminal. The mobile terminal 650 mainly includes an MPU 651, a GDC 660, an indicator 665, and the sound output unit 680.

Similar to the MPU 51 of the audio device 50, the MPU 651 provides an arithmetic processing control unit that is supplied with power from a power supply (PS) 650a and controls the indicator 665 and the sound output unit 680. Similar to the GDC 60 of the audio device 50, the GDC 660 provides a controller that controls the display of the indicator 665. The indicator 665 uses a liquid crystal panel, for example.

The sound output unit 680 is configured similarly to the audio device 50 or uses a simplified version of the configuration used for the audio device 50. The sound output unit 680 mainly includes a DSP 681, an amplifier 683, and a speaker 685. The sound output unit 80 is formed to be capable of outputting the sound information item. More specifically, the speaker 85 can sound a sound pattern as the sound information item.

The amplifier (AMP) 683 and the speaker 685 use output limits lower than the output limit for the sound output unit 80 of the audio device 50 but can supplement the sound output unit 40 of the vehicle information provision device 10.

The MPU 611 in the vehicle information provision device 10 according to the sixth embodiment can communicate with the electronic control device 1 via a communication interface 10b. The mobile terminal 650 can also communicate with the electronic control device 1 via a communication interface (I/F) 650b. Therefore, the vehicle information provision device 10 is configured to be indirectly communicable with the mobile terminal 650. The vehicle information provision device 10 may be configured to be directly communicable with the mobile terminal 650.

As illustrated in FIG. 13, an MPU 611 according to the sixth embodiment further includes a carry-in determination unit 616 as a function block. The carry-in determination unit 616 determines whether the mobile terminal 650 is carried in the vehicle. For example, the determination is performed by acquiring position information representing the current position of the mobile terminal 650 capable of communication via the electronic control device 1 and determining whether there is a communication terminal currently placed in the vehicle.

The description below explains a process performed by the vehicle information provision system 100 (mainly the MPU 611) according to the sixth embodiment based on a flowchart in FIG. 14. A sequence of the process is performed at a specified interval or a specified instance, for example.

S601 through S607 are comparable to S301 through 307 in the first embodiment. The process proceeds to S608 after S607.

In S608, the carry-in determination unit 616 in the MPU 611 determines whether the mobile terminal 650 is carried in the vehicle. If the determination in S608 is affirmed, the process proceeds to S609. If the determination in S608 is negated, the process proceeds to S630.

S609, S610, S620, and S630 are comparable to S309, S310, S320, and S330 in the third embodiment.

When it is necessary to simultaneously provide a plurality of sound information items related to the vehicle, the sixth embodiment issues a request to output at least one of the sound information items from the sound output unit 680 that is provided for the mobile terminal 650 and is formed to be capable of outputting the sound information item. The sound information items are separately output to the sound output unit 40 provided in the device and the sound output unit 680 provided apart from the sound output unit 40. The sound output units 40 and 680 can provide the sound information item. It is possible to inhibit a status where some of the sound information items cannot be provided or some of the sound information items cause too small an output value and are hardly audible. It is possible to favorably provide a plurality of sound information items.

When it is determined that the mobile terminal 650 is carried in the vehicle, the sixth embodiment allows the sound output unit 680 in the mobile terminal 650 to output some of the sound information items. It is possible to inhibit a status where the mobile terminal 650 outside the vehicle accidentally outputs the sound information item and an occupant in the vehicle cannot hear the sound information item. As a result, it is possible to avoid a discrepancy between the device 10 having provided the sound information item and an occupant having unsuccessfully heard the sound information item.

According to the sixth embodiment, the sound output unit 40 provided in the vehicle information provision device 10 is comparable to a "device-side sound output unit." The sound output unit 680 provided for the mobile terminal 650 is comparable to a "terminal-side sound output unit" and a "terminal-side speaker".

Other Embodiments

While there have been described embodiments, the present disclosure should not be understood exclusively in terms of the embodiments but may be applicable to various embodiments and combinations within the spirit and scope of the disclosure.

Specifically, as a first modification, the output limit for the speaker 44 may be smaller than the output limit for the sound IC 41. The sound output unit 40 may use the output limit for the speaker 44.

As a second modification, the sound output control unit 18 may compare an output value with the output limit by using voltage units (V) instead of sound pressure units (Pa or dB).

As a third modification, instead of using the sound IC 41, the sound output unit 40 may be configured so that a synthesis circuit synthesizes a plurality of analog signals supplied via a filter corresponding to each sound information item, and then, an amplifier amplifies the synthesized signal and supplies the signal to the speaker 44.

As a fourth modification, instead of using the sound output unit 80 of the audio device 50, the necessity determination unit 14 may request output from a sound output unit such as a car navigation system.

As a fifth modification, at least part of the function blocks such as the information acquisition unit 12, the necessity determination unit 14, and the sound output control unit 18 may be provided by the components except the MPU 11 in the vehicle information provision device 10. In the vehicle information provision system 100, at least part of the function blocks such as the information acquisition unit 12, the necessity determination unit 14, and the sound output control unit 18 may be provided by the components outside the vehicle information provision device 10 such as the electronic control device 1 or the MPU 51 of the audio device 50.

As a sixth modification, the sound output control unit 18 may not be provided with the output limit determination unit 19. Specifically, when it is necessary to simultaneously provide a plurality of sound information items related to the vehicle, the sound output control unit 18 may request the sound output unit 80 to output at least one of sound information items without performing the determination on the output limit for the sound output unit 40.

As a seventh modification, the vehicle information provision system 100 may be provided with the first sound output unit and the second sound output unit outside the vehicle information provision device 10.

As an eighth modification concerning the second embodiment, in S207, the priority determination unit 221 may select the most sound information item having the high priority.

As a ninth modification concerning the fifth embodiment, in S530, the priority determination unit 521 may select the sound information item having the high priority on condition that the output virtual sound pressure is lower than or equal to the output limit.

As a tenth modification, the audio device 50 according to the first, second, fourth, and fifth embodiments may be replaced by the mobile terminal 650 according to the sixth embodiment.

The flowcharts or the processing depicted in the flowcharts described in the present disclosure include a plurality of sections (also referred to as steps) each of which is expressed as S101 or the like. Each of the sections can further be divided into a plurality of subsections, or a plurality of sections can be combined together to configure a single section. These sections can alternatively be referred to as circuits, devices, modules, or means.

Also, each or a combination of the plurality of portions may be implemented as (i) a portion of software in combination with a hardware unit (for example, a computer), as well as (ii) a portion of hardware (for example, an integrated circuit, a wired logic circuit), with or without the functionality of the associated device. Further, the hardware part can be configured inside the microcomputer.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A vehicle information provision device mounted on a vehicle, the vehicle information provision device comprising:
   a device-side speaker configured to output at least one sound information item out of a plurality of sound information items; and
   one or more processors configured to:
   determine whether the plurality of sound information items related to the vehicle are necessary to be provided; and
   request a vehicle-side speaker outside the vehicle information provision device to output at least one sound information item out of the plurality of sound information items when the one or more processors determine that the plurality of sound information items are necessary to be simultaneously provided.

2. The vehicle information provision device according to claim 1, wherein
   the one or more processors are further configured to:
   determine whether a virtual output value is estimated to exceed an output limit for the device-side speaker, the virtual output value being an output value in which the device-side speaker simultaneously outputs the plurality of sound information items necessary to be provided when the one or more processors determine that the plurality of sound information items are necessary to be simultaneously provided; and
   request the vehicle-side speaker to output the at least one sound information item out of the plurality of sound information items when the one or more processors determine that the virtual output value exceeds the output limit.

3. The vehicle information provision device according to claim 2, wherein
   when the one or more processors determine that the virtual output value exceeds the output limit for the device-side speaker, the one or more processors request the device-side speaker to output a sound information item having a high priority out of the plurality of sound information items within a range equal to or smaller than the output limit and request the vehicle-side speaker to output a sound information item having a lower priority than the sound information item having the high priority out of the plurality of sound information items.

4. The vehicle information provision device according to claim 2, wherein:
   the one or more processors are further configured to searches for, out of the plurality of sound information items, a combination of the plurality of sound information items in which the virtual output value to be output is equal to or smaller than the output limit in case that the combination of the plurality of sound information items are simultaneously output from the device-side speaker when the one or more processors determine that the plurality of sound information items are necessary to be simultaneously provided and determine that the virtual output value exceeds the output limit; and
   the one or more processors cause the device-side speaker to output at least one sound information item out of the selected combination of the plurality of sound information items and cause the vehicle-side speaker to output the plurality of sound information items except for the combination of the plurality of sound information items.

5. The vehicle information provision device according to claim 2, wherein
   when the one or more processors determine that the virtual output value is equal to or smaller than the output limit for the device-side speaker, the one or more processors cause the device-side speaker to output the plurality of sound information items.

6. The vehicle information provision device according to claim 2, wherein
   the one or more processors are further configured to determine whether the vehicle-side speaker that outputs the at least one sound information item out of the plurality of sound information items in response to the request exists.

7. The vehicle information provision device according to claim 6, wherein
   when the one or more processors determine that the vehicle-side speaker does not exist, the one or more processors reduce an output value of each of the plurality of sound information items at a same rate and cause the device-side speaker to output the plurality of sound information items.

8. The vehicle information provision device according to claim 6, wherein
   when the one or more processors determine that the vehicle-side speaker does not exist, the one or more processors cause the device-side speaker to output a sound information item having a high priority out of the plurality of sound information items.

9. A vehicle information provision system mounted on a vehicle, the vehicle information provision system comprising:
   a device-side speaker configured to output at least one sound information item out of a plurality of sound information items;
   a vehicle-side speaker provided separately from the device-side speaker and configured to output at least one sound information item out of the plurality of sound information items; and
   one or more processors configured to:
   determine whether the plurality of sound information items related to the vehicle are necessary to be provided; and request the device-side speaker to output the at least one sound information item out of the plurality of sound information items and request the vehicle-side speaker to output the at least one sound information item out of the plurality of sound information items different from the at least one sound information item requested to be output from the device-side speaker when the one or more processors determine that the plurality of sound information items are necessary to be simultaneously provided.

10. The vehicle information provision system according to claim 9, wherein the one or more processors are further configured to:

determine whether a virtual output value is estimated to exceed an output limit for the device-side speaker, the virtual output value being an output value in which the device-side speaker simultaneously outputs the plurality of sound information items necessary to be provided when the one or more processors determine that the plurality of sound information items are necessary to be simultaneously provided; and request the vehicle-side speaker to output the at least one sound information item out of the plurality of sound information items when the one or more processors determine that the virtual output value exceeds the output limit.

11. A vehicle information provision device mounted on a vehicle and configured to communicate with a mobile terminal including a terminal-side speaker configured to output at least one sound information item out of a plurality of sound information items, the vehicle information provision device comprising:

a device-side speaker configured to output at least one sound information item out of the plurality of sound information items; and one or more processors configured to:

determine whether the plurality of sound information items related to the vehicle are necessary to be provided; and request the terminal-side speaker to output the at least one sound information item out of the plurality of sound information items when the one or more processors determine that the plurality of sound information items are necessary to be simultaneously provided.

12. The vehicle information provision device according to claim 11, wherein:

the one or more processors are further configured to determine whether the mobile terminal is carried in the vehicle; and the one or more processors request the terminal-side speaker to output the at least one sound information item out of the plurality of sound information items when the one or more processors determine that the mobile terminal is carried in the vehicle.

\* \* \* \* \*